(12) United States Patent
Wu

(10) Patent No.: US 6,785,385 B2
(45) Date of Patent: Aug. 31, 2004

(54) SAFETY HELMET STRUCTURE WITH A HAND-FREE RECEIVER

(76) Inventor: Shang-Hua Wu, No. 127-2, Lane 667, Chung-Sun Rd., Shen-Gang Hsien, Taichung Hsien (TW)

( * ) Notice: Subject to any disclaimer, the term of this patent is extended or adjusted under 35 U.S.C. 154(b) by 469 days.

(21) Appl. No.: 09/955,990

(22) Filed: Sep. 20, 2001

(65) Prior Publication Data

US 2003/0053619 A1 Mar. 20, 2003

(51) Int. Cl.[7] ............................................... H04M 1/00
(52) U.S. Cl. ...................................................... 379/430
(58) Field of Search ...................... 379/430; 455/575.2; 340/479; 381/370, 371, 374, 376

(56) References Cited

U.S. PATENT DOCUMENTS 6,157,298 A * 12/2000 Garfinkel et al. ........... 340/479
6,546,264 B1 * 4/2003 Kennedy .................. 455/575.2

* cited by examiner

Primary Examiner—Jack Chiang

(57) ABSTRACT

A safety helmet structure includes a safety helmet formed with a base portion which is located at a position adjacent to a user's one ear. The base portion is provided with an insertion groove which is provided with a threaded seat. A seat is mounted on the base portion and provided with an insertion flange that may be inserted into the insertion groove of the base portion. The seat has a receiver, and a speaker. A signal connecting cord is extended from the seat, and connected to a mobile telephone. The seat is provided with a through hole for passage of a threaded rod. The threaded rod is provided with a thread that mates with the thread of the threaded seat. A spring is mounted between the base portion and the seat for adjusting the protruding position of the seat.

1 Claim, 4 Drawing Sheets

SAFETY HELMET STRUCTURE WITH A HAND-FREE RECEIVER

BACKGROUND OF THE INVENTION

1. Field of the Invention

The present invention relates to a safety helmet structure with a hand-free receiver.

2. Description of the Related Art

A conventional safety helmet structure with a hand-free receiver in accordance with the prior art shown in FIG. 5 comprises a safety helmet 40, and a receiving/speaking device 41 mounted on the outer wall of the safety helmet 40. The receiving/speaking device 41 is connected to a mobile telephone and includes an earphone 42, and a microphone 43.

However, the conventional safety helmet structure with a hand-free receiver has the following disadvantages.

1. The receiving/speaking device 41 is mounted on the outer wall of the safety helmet 40, so that it is easily broken due to collision.

2. The earphone 42 is extended to the inner wall of the safety helmet 40 and located at a constant position thereof. For different users, the position of the user's one ear relative to the inner wall of the safety helmet 40 is different, so that the earphone 42 is not available for different users.

3. The position of the earphone 42 is fixed, and the earphone 42 cannot be closely rested on the user's one ear, so that the hearing effect is not clear.

SUMMARY OF THE INVENTION

The present invention has arisen to mitigate and/or obviate the disadvantage of the conventional safety helmet structure with a hand-free receiver.

The primary objective of the present invention is to provide a safety helmet structure with a hand-free receiver, wherein the seat may be hidden in the safety helmet to prevent damage.

Another objective of the present invention is to provide a safety helmet structure with a hand-free receiver, wherein the position of the seat may be adjusted to suit requirements of different users.

A further objective of the present invention is to provide a safety helmet structure with a hand-free receiver, wherein the seat may be closely rested on the user's one ear, thereby enhancing the clearance of the sound.

In accordance with the present invention, there is provided a safety helmet structure with a hand-free receiver, comprising: a safety helmet formed with a base portion which is located at a position adjacent to a user's one ear, the base portion provided with an elongated insertion groove which is provided with a threaded seat that has a thread, a seat mounted on the base portion and provided with an insertion flange that may be inserted into the insertion groove of the base portion, the seat having a receiver, and a speaker, a signal connecting cord extended from the seat, and connected to a mobile telephone, the seat provided with a through hole for passage of a threaded rod, the threaded rod provided with a thread that mates with the thread of the threaded seat, and a spring mounted between the base portion and the seat for adjusting the protruding position of the seat.

Further benefits and advantages of the present invention will become apparent after a careful reading of the detailed description with appropriate reference to the accompanying drawings.

DETAILED DESCRIPTION OF THE INVENTION

Figure 1:
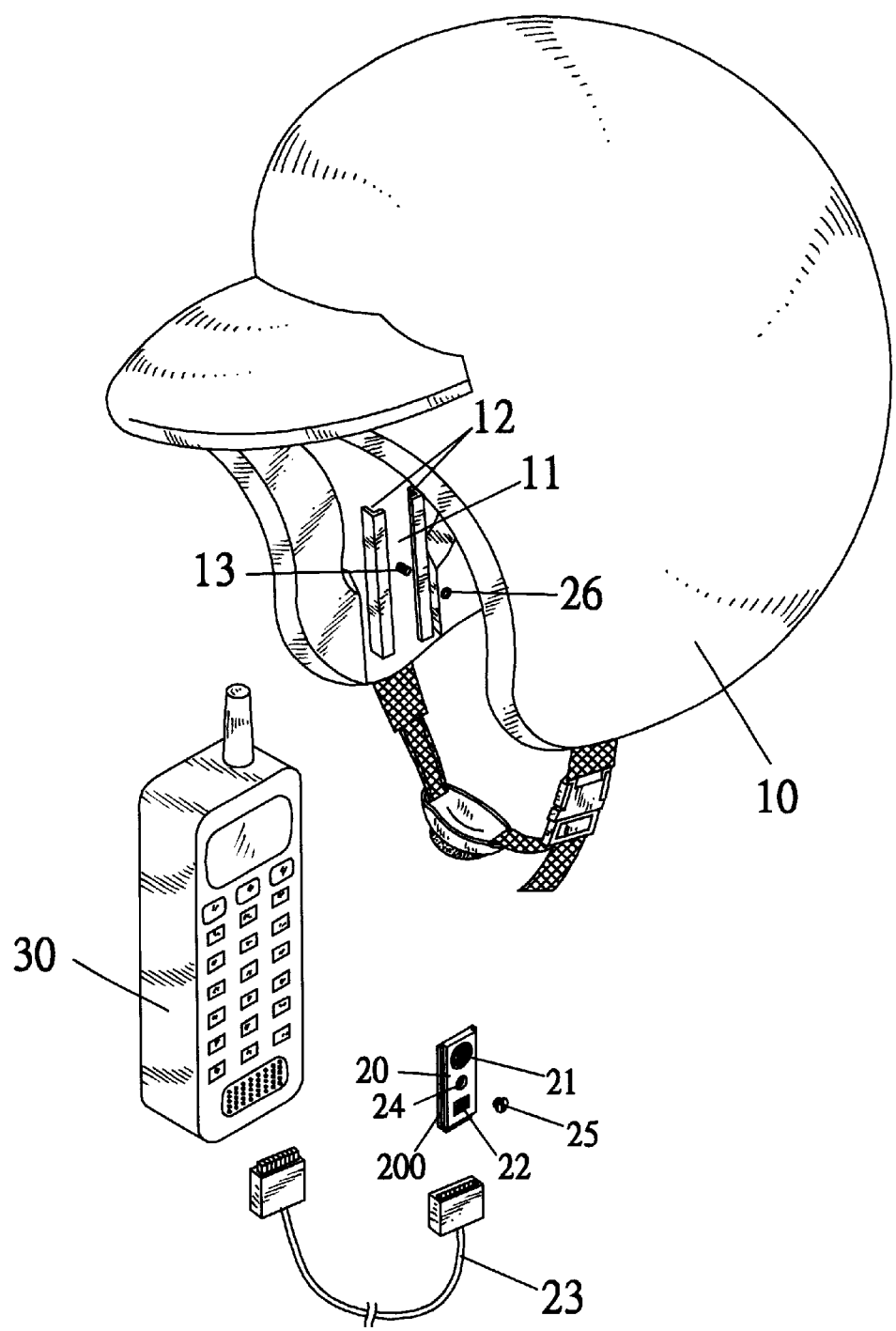
FIG. 1 is an exploded perspective view of a safety helmet structure with a hand-free receiver in accordance with the present invention.

Referring to the drawings and initially to FIG. 1, a safety helmet structure with a hand-free receiver in accordance with the present invention comprises a safety helmet 10 formed with a base portion 11 which is located at a position adjacent to a user's one ear. The base portion 11 is provided with an elongated insertion groove 12 which is provided with a threaded seat 13 that has a thread. A seat 20 is provided with an insertion flange 200 that may be inserted into the insertion groove 12. The seat 20 has a receiver 21, and a speaker 22. A signal connecting cord 23 is extended from the seat 20, and is connected to a mobile telephone (cellular phone) 30. The seat 20 is provided with a through hole 24 for passage of a threaded rod 25. The threaded rod 25 is provided with a thread that mates with the thread of the threaded seat 13. A spring 26 is mounted between the insertion groove 12 and the seat 20, for adjusting the protruding position of the seat 20.

Figure 2:
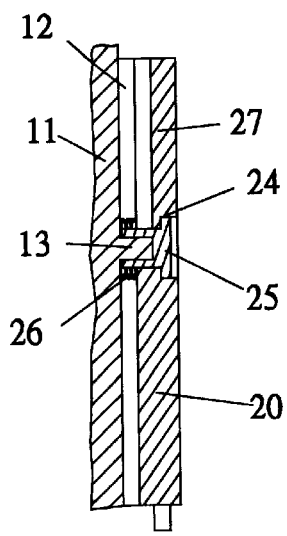
FIG. 2 is a partially cut-away cross-sectional assembly view of the safety helmet structure with a hand-free receiver as shown in FIG. 1.
Figure 3:
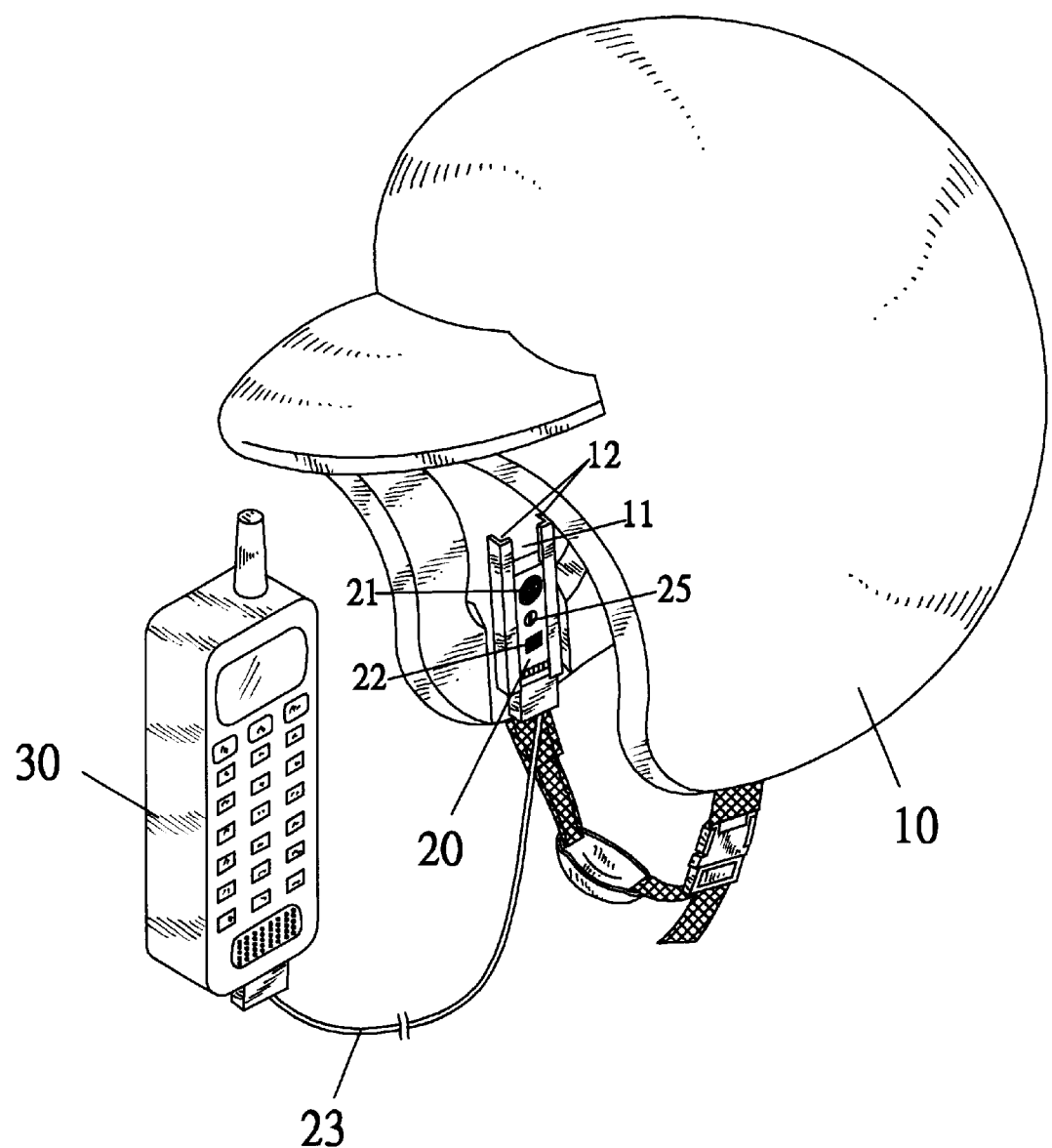
FIG. 3 is a perspective assembly view of the safety helmet structure with a hand-free receiver as shown in FIG. 1.
Figure 5:
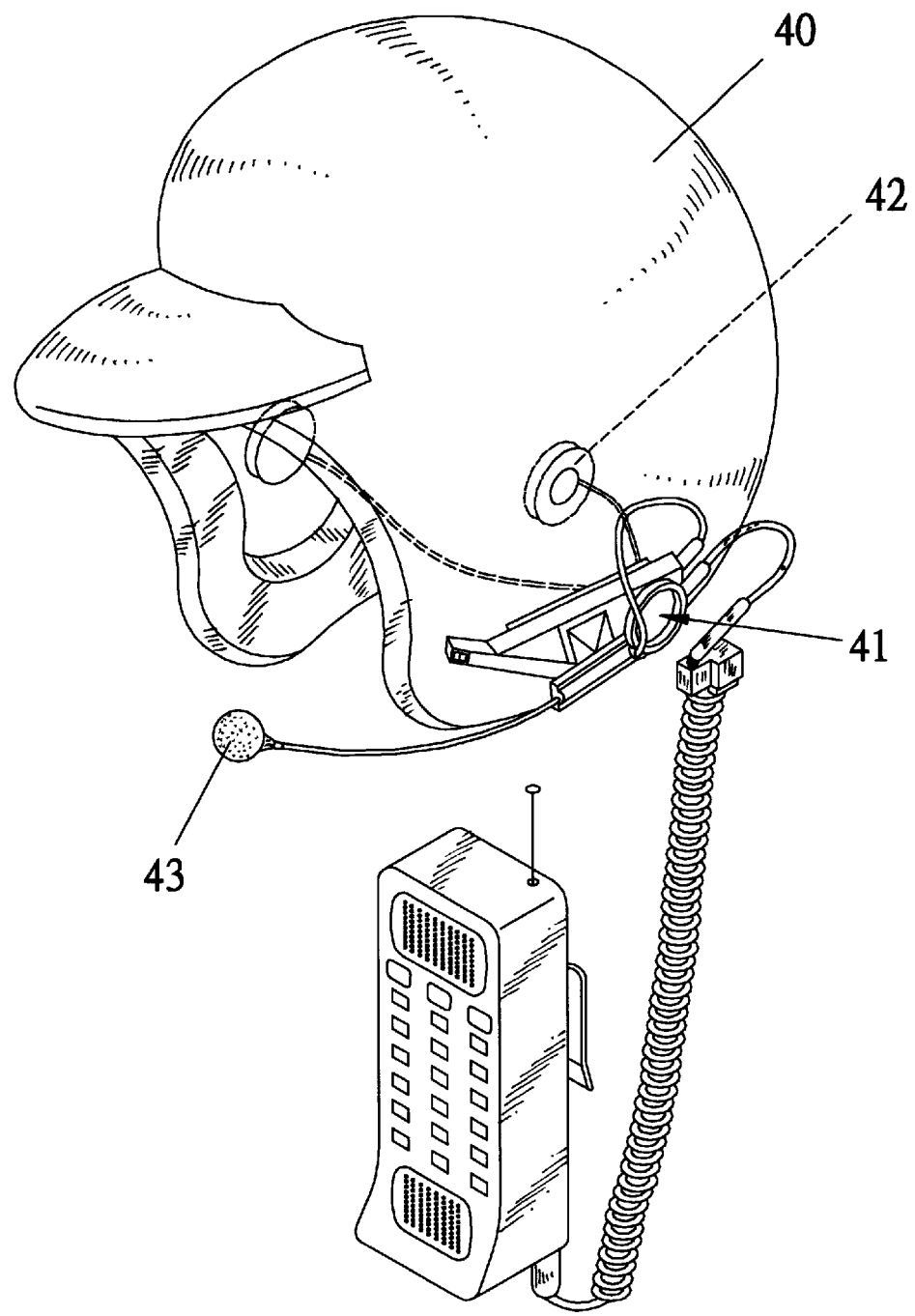
FIG. 5 is a perspective view of a conventional safety helmet structure with a hand-free receiver in accordance with the prior art.

Referring to FIGS. 1–3, when the safety helmet structure with a hand-free receiver in accordance with the present invention is assembled, the spring 26 is mounted on the threaded seat 13, and is pressed properly. The seat 20 is then inserted into the insertion groove 12 of the inner wall of the safety helmet 10. The back face of the seat 20 may be provided with an elongated slot 27, such that the seat 20 may conveniently pass through the threaded seat 13 when the seat 20 is inserted into the insertion groove 12. Thus, the seat 20 may be retained in the insertion groove 12. The two ends of the spring 26 are urged between the base portion 11 and the seat 20 respectively. The threaded rod 25 is then passed through the through hole 24 of the seat 20, and is screwed onto the threaded seat 13, thereby accomplishing the assembly of the safety helmet structure with a hand-free receiver in accordance with the present invention. The signal connecting cord 23 extended from the seat 20 is then connected to the mobile telephone 30. Thus, the sound arising from the mobile telephone 30 may be transmitted to the receiver 21 of the seat 20, so that the user may hear the sound of the calling party. The user may also speak directly, whereby the user's sound may be transmitted through the speaker 22 of the seat 20 and the signal connecting cord 23 to the mobile telephone 30, and is then transmitted through the mobile telephone 30 to the opposite party.

Figure 4:
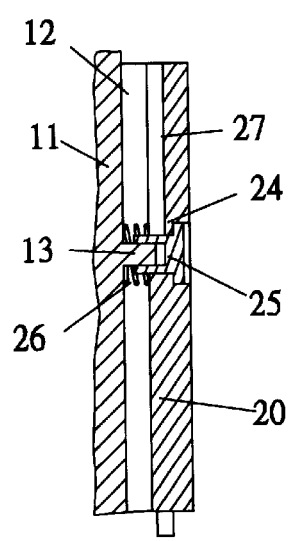
FIG. 4 is a schematic operational view of the safety helmet structure with a hand-free receiver as shown in FIG. 2 in use.

Referring to FIG. 4, the user puts on the safety helmet 10. If the seat 20 is not closely rested on the user's one ear, the threaded rod 25 may be unscrewed, whereby the seat 20 is pressed outward by elasticity of the spring 26, so that the seat 20 is slightly protruded outward, so that the seat 20 is closely rested on the user's one ear, thereby achieving the effect of a convenient use.

Accordingly, in the safety helmet structure with a hand-free receiver in accordance with the present invention, the seat may be hidden in the safety helmet to prevent damage. In addition, the position of the seat may be adjusted to suit requirements of different users. Further, the seat may be closely rested on the user's one ear, thereby enhancing the clearance of the sound.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A safety helmet structure with a hand-free receiver, comprising: a safety helmet formed with a base portion which is located at a position adjacent to a user's one ear, the base portion provided with an elongated insertion groove which is provided with a threaded seat that has a thread, a seat mounted on the base portion and provided with an insertion flange that may be inserted into the insertion groove of the base portion, the seat having a receiver, and a speaker, a signal connecting cord extended from the seat, and connected to a mobile telephone, the seat provided with a through hole for passage of a threaded rod, the threaded rod provided with a thread that mates with the thread of the threaded seat, and a spring mounted between the base portion and the seat.

* * * * *